United States Patent
Dobbelaere

(10) Patent No.: US 9,401,995 B2
(45) Date of Patent: Jul. 26, 2016

(54) METHOD AND ARRANGEMENT FOR ECHO CANCELLATION IN CONFERENCE SYSTEMS

(71) Applicant: Alcatel Lucent, Paris (FR)

(72) Inventor: Philippe Dobbelaere, Ranst (BE)

(73) Assignee: Alcatel Lucent, Boulogne-Billancourt (FR)

( * ) Notice: Subject to any disclaimer, the term of this patent is extended or adjusted under 35 U.S.C. 154(b) by 54 days.

(21) Appl. No.: 14/355,451

(22) PCT Filed: Nov. 15, 2012

(86) PCT No.: PCT/EP2012/072696
§ 371 (c)(1),
(2) Date: Apr. 30, 2014

(87) PCT Pub. No.: WO2013/075998
PCT Pub. Date: May 30, 2013

(65) Prior Publication Data
US 2014/0307590 A1    Oct. 16, 2014

(30) Foreign Application Priority Data

Nov. 24, 2011 (EP) .................... 11306550

(51) Int. Cl.
*H04M 3/56* (2006.01)
*H04M 9/08* (2006.01)
*H04L 12/18* (2006.01)
*H04M 3/00* (2006.01)

(52) U.S. Cl.
CPC ............... *H04M 3/568* (2013.01); *H04L 12/18* (2013.01); *H04M 3/002* (2013.01); *H04M 9/082* (2013.01)

(58) Field of Classification Search
CPC ..................................... H04M 3/568
See application file for complete search history.

(56) References Cited

U.S. PATENT DOCUMENTS

| | | |
|---|---|---|
| 6,320,958 B1 | 11/2001 | Sekine |
| 6,327,276 B1 | 12/2001 | Robert et al. |
| 6,501,272 B1 | 12/2002 | Haacke et al. |
| 2007/0189507 A1 | 8/2007 | Tittle et al. |
| 2008/0165707 A1 | 7/2008 | Baird et al. |
| 2008/0310328 A1 | 12/2008 | Li et al. |

FOREIGN PATENT DOCUMENTS

| | | |
|---|---|---|
| CN | 1198620 | 11/1998 |
| JP | S59153367 | 9/1984 |

(Continued)

*Primary Examiner* — Dang Ton
*Assistant Examiner* — Kevin Lee
(74) *Attorney, Agent, or Firm* — Patti & Malvone Law Group, LLC

(57) ABSTRACT

A technique is provided for echo cancellation. The technique includes marking respective source signals with a respective marker signal to identify respective starting time references of the respective source signals and to identify respective transmitters to transmit respectively obtained marked source signals, transmitting the respectively marked source signals by the respective transmitters to at least one aggregate node, summing the respective marked source signals received by the at least one aggregate node to create a multicast signal for provision, via a multicast node, to respective receivers associated to the respective transmitters, determining respective round trip power normalization and round trip delay values for modifying, in the respective receivers, the respective marked source signals, to obtain respective delayed and normalized respective marked source signals, and subtracting, at the respective receivers, the respective round trip delayed and normalized marked source signal from the multicast signal to obtain respective echo cancelled multicast signals in the respective receivers.

7 Claims, 2 Drawing Sheets

(56) References Cited

FOREIGN PATENT DOCUMENTS

| | | |
|---|---|---|
| JP | H10164239 | 6/1998 |
| JP | 2000151476 | 5/2000 |
| JP | 2002033736 | 1/2002 |
| JP | 2003060792 | 2/2003 |
| JP | 2003333560 | 11/2003 |
| JP | 2005513835 | 5/2005 |
| JP | 2006295421 | 10/2006 |
| TW | 200520474 | 6/2005 |
| TW | I264934 | 10/2006 |
| TW | I348291 | 9/2011 |
| WO | 2005046232 | 5/2005 |

METHOD AND ARRANGEMENT FOR ECHO CANCELLATION IN CONFERENCE SYSTEMS

TECHNICAL FIELD

The present invention relates to a method for echo cancellation (e.g., conference services).

BACKGROUND

Presently in multi-party audio connections such as used in teleconference systems over significant distances, the aggregate signal that represents all the audio sources may have a considerable delay with respect to every individual source. Due to this, there is a need to filter out the local audio source of this aggregate signal when it is received back at the source premises e.g. via a loudspeaker. This is because this delayed original signal would be conceived as a serious echo with a delay in the order of one second or even more. Traditional implementations at a central server therefore may selectively sum up all the other signals, for generating a bundle of individually differing aggregate signals. This however results in a heavy networking load.

SUMMARY

It is an object of embodiments of the present invention to provide an alternative method and arrangement for enabling a simple, while yet effective method for echo cancellation for such applications as conference bridges where signals of a large number of participants are added to generate a composite signal.

It is to be remarked that it is not the objective of embodiments of the invention to deal with acoustic echo cancellation which acoustic echo is e.g. due to coupling of a loudspeaker to a microphone. It is thus an object to provide a solution for suppression of return-echo of a transmitted signal. It is evident that also acoustic echo needs to be suppressed, but other techniques are generally available for this.

According to embodiments of the present invention this object is achieved by a method for echo cancellation, said method comprising the steps of marking respective source signals with a respective marker signal for identifying respective starting timing references of said respective source signals and for identifying the respective transmitters for transmitting respectively obtained marked source signals,

- transmission of the respectively marked source signals by said respective transmitters to at least one aggregate node,
- summing the respective marked source signals received by said at least one aggregate node to thereby create a multicast signal for provision, via a multicast node (mcast) to respective receivers associated to the respective transmitters,
- determining respective round trip power normalization and round trip delay values for modifying, in said respective receivers, said respective marked source signals, thereby obtaining respective delayed and normalized respective marked source signals,
- subtracting, at said respective receivers the respective round trip delayed and normalized marked source signal from said multicast signal to thereby obtain respective echo cancelled multicast signals in said respective receivers.

This significantly reduces the processing power and energy required to support conferencing services spanning large areas, because no selective processing in the central server is needed, and the local echo cancellation is now reduced to a much simpler subtraction of the delayed and gain adjusted marked source signal from the aggregate signal in the receivers.

In an embodiment the method further comprises the steps of receiving the respectively transmitted marked source signals by an aggregate node, separating, in said aggregate node of the respective received marked source signals into respective delayed source signals and respective markers, and summing the respective delayed source signals and respective markers again to thereby create an aggregate signal for provision towards said multicast node.

This solution proves to be very scalable with respect to the number of active participants as several clusters of transmitter/receiver nodes coupled to one aggregate node can be further connected into a tree-like configuration to a final multicast node. With such a configuration adding a passive participant who is just listening to audio, is very easy, energy efficient and does not require any further processing power or heavy network load.

In an embodiment the marker signal is generated as an in-band signal to said source signal.

This has the advantage that the resulting multicast signal, is a single signal which can be transparently handled by legacy equipment carrying this signal.

In an embodiment different ones of such in-band signals for different transmitters can be generated based on pseudo-random codes with suitable correlation properties that are inserted as e.g. a low power noise signal in the original audio signal so that only a correlating decoder is able to extract the marker while being hardly observable by humans. Each of these codes is typical for a particular transmitter, and these codes are normally determined beforehand e.g. by means of a master software program for realizing this method.

In another embodiment spare or unused audio signal bits can used for in-band coding of the marker. By carefully attributing multiple excluded values the symbol bits from the audio decoder will be masked. In an 8-bit system, it may for instance be the case that the following combinations representing 0, 127 and 255 are excluded. Any 3 bits satisfying MVM with M in {0, 127, 255} and V not in {0, 127, 255} is a 1 symbol, Any 3 bits MMV is a 0 symbol.

In yet another embodiment said marker signal is generated as an as an out-of-band signal to said source signal.

The present invention relates as well to embodiments of a transmitter comprising a signal source modification means adapted to mark a source signal with a marker signal for identifying a time reference of said source signal and for identifying the transmitter, said signal source modification means thereby being adapted to generate a marked source signal for transmission to an aggregator node.

The present invention relates as well to embodiments of an aggregate node coupled to a plurality of such transmitters, and adapted to sum respective received marked source signals sent by these transmitters, into an aggregate signal for further transmission towards a multicast node.

In an embodiment, these marked received source signals are first separated into respective marker signals and delayed source signals, followed by a step of synchronization towards a common time base, which synchronized signals are next summed up to form the aggregate signal for further transmission towards a multicast node.

The present invention relates as well to embodiments of a multicast node coupled to at least one aggregate node and adapted to receive from said at least one aggregate node either a multicast signal further provisioning towards a plurality of respective receivers associated to said plurality of respective transmitters.

Alternatively the multicast node can be combined with the final aggregate node such as to be adapted to receive the at least one respective aggregate signal and to sum said at least one respective aggregate signals into a multicast aggregate signal for further provisioning towards a plurality of respective receivers associated to said plurality of respective transmitters.

In addition the present invention relates as well to embodiments of a receiver being coupled to a multicast node and associated to a transmitter, said receiver being adapted to receive a multicast signal from the multicast node, said receiver being further adapted to determine respective round trip power normalization and round trip delay values for being used during a modifying step, in said receiver, of a respective marked source signal, provided by said transmitter associated to said receiver, for generating a respective delayed and normalized marked source signal, said receiver further being adapted to subtract the respective round trip delayed and normalized marked source signal from said multicast signal to thereby obtain an echo cancelled multicast signal.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION

Figure 1:
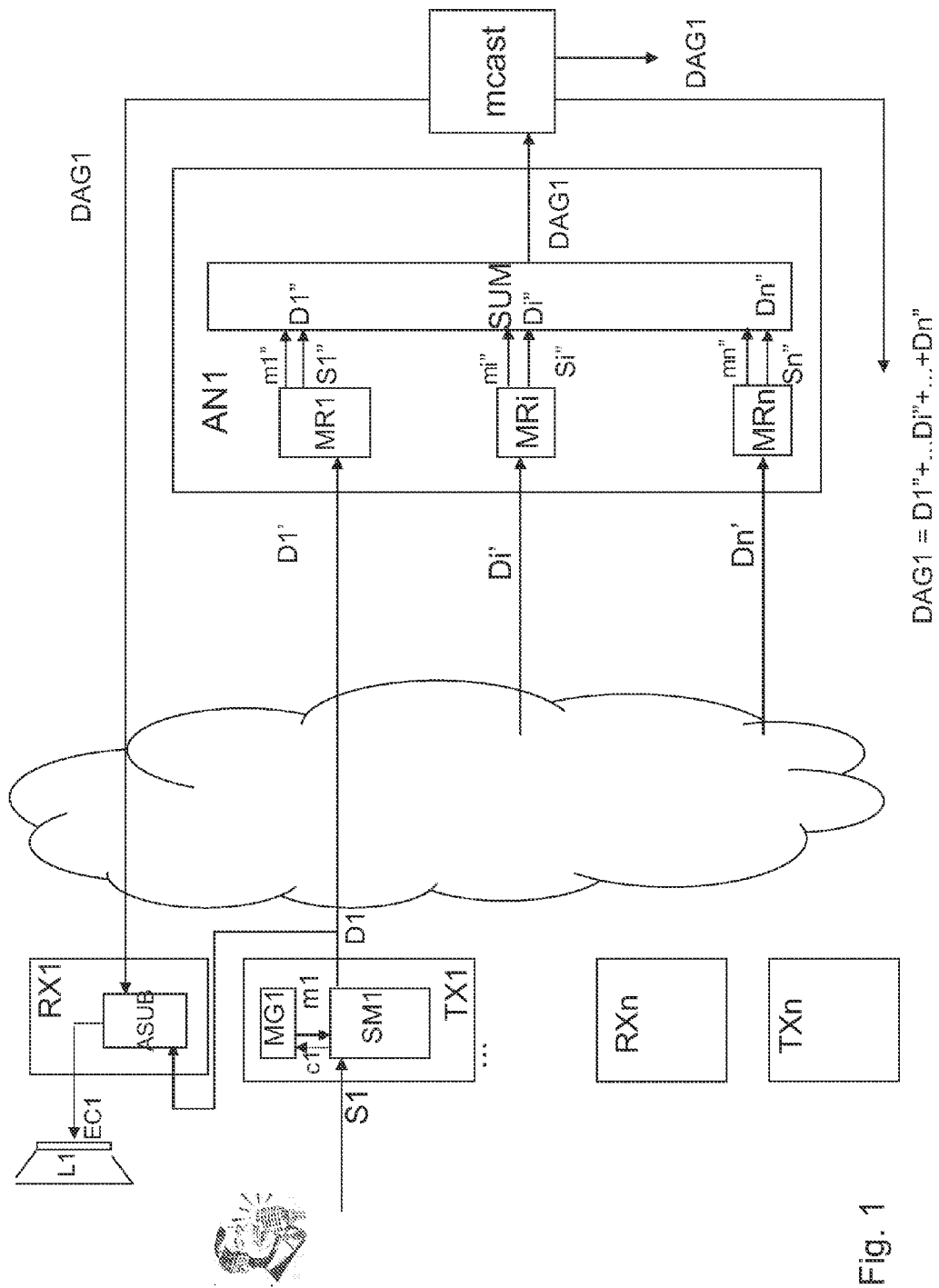
FIG. 1 shows a configuration of n transmitter/receivers coupled to one aggregate node and to a multicast node.

FIG. 1 shows an example of a system comprising a plurality of transmitters TX1 to TXn. In order not to overload the drawing only TX1 is shown into sufficient detail. However all other transmitters of this system are similar to TX1.

The system will be explained by way of an example of an audio conferencing system. However a system as shown in the figures and explained in the following paragraphs may be as well be applied to any type of conferencing arrangement, whether being audio/video/data or a mix of all of this.

TX1 comprises means to receive a source input signal. In FIG. 1 this source input signal to the transmitter is the A/D converted digital signal S1, representing the analogue voice signal uttered by the denoted speaker, which analogue signal is sensed by means of a microphone, and converted into a digital speech or digital audio signal by means of well known circuitry.

Transmitter TX1 further comprises a signal source modification means SM1 which is adapted to receive the source signal S1, and to trigger, upon this receipt, a marker generating means MG1. The trigger signal is denoted c1 as dashed line between SM1 to MG1. MG1 is, upon receipt of this trigger signal c1, adapted to generate a marker signal m1, which marker signal m1 is used to identify a starting time reference of the source signal and to also identify the transmitter TX1. This identification of the transmitter can e.g. a public IP address or a MAC address, or an account on a conferencing system or structured phone number etc. and is usually provided under the form of a bit string. The identification of the time reference of the source signal can be performed e.g. by the insertion of the symbols representing the transmitter identification in the first speech packet, e.g. by making use of free or spare bits. The position of where these marker bits are inserted in the stream can then be representative to indicate the timing reference This solution corresponds to an in-band solution.

Alternatively, an out-of band solution, meaning that a separate signal is used for this marker, may be used. In an embodiment this may be represented by a separate parallel sequence of bits, e.g. comprising a pointer to a datastructure in the terminal, which datastructure comprises the terminal identification. This or a second pointer may also be pointing to a particular position in the datastream itself, so as to be indicative of the start time, to indicate the timing reference. Alternatively, the relative start time of this extra bitstream, with respect to the data bitstream itself, may itself also represent a timing reference, thereby alleviating the use of a second pointer.

The signal source modification means SM1 will thereby modify the incoming source signal by inclusion of this marker signal m1 into the source signal S1. The resulting signal is denoted a marked source signal D1 and is transmitted via a communications network to multicast node mcast.

When the marker signal m1 is generated as an in-band signal to said source signal S1, it may show up as additional noise, in order to hide it in the signal. In-band signals for markers for each distinct terminal can e.g. be based on pseudo-random codes with suitable correlation properties, between the terminals, enabling a good discrimination afterwards.

Alternatively the marker signal may thus be generated as an out-of-band signal to said source signal S1. This has the advantage that signals can be carried without additional noise but has the disadvantage that it needs an additional stream synchronized with the audio source datastream for carrying the time information.

The resulting signal, being denoted marked source signal, is represented by D1 in FIG. 1. D1 can thus be the source signal, wherein some spare bits now received some dedicated value, or may be comprised of two parallel synchronized signals: S1 together with m1.

Each participating transmitter TX1 to TXn of the conferencing system is then adapted to generate and transmit their marked source signals to a multicast node, in general via an aggregate node. Such an aggregate node is denoted AN1 on FIG. 1 and is adapted to receive respective delayed marked source signals, denoted D1 to Dn sent by the transmitters TX1 to TXn coupled to this aggregate node. Because such an aggregate node can be placed at a considerable distance from the transmitters, the respective marked source signals will generally have undergone respective network delays. In one embodiment, the aggregate node AN1 will just sum these different delayed signals into a summation signal. In another preferred embodiment, the aggregate node AN1 is adapted to separate the respective delayed marked source signals into their original respective delayed marker signals m1", . . . ,mn" and into respective delayed source signals denoted S1" to Sn". This is shown in the embodiment of FIG. 1.

In a next step these resynchronized respective delayed source signals S1", . . . ,Sn" as well as their reconstructed markers m1" to mn" are integrated again for forming resynchronized marked source signals D1" to Dn", and these respective resynchronized marked source signals are next summed up to generate an aggregate signal DAG1 for further transmission towards a multicast node, and possibly via another aggregate node.

In the earlier described embodiment, in which the respective delayed marked source signals D1' to Dn' were not split into their respective source signals and marker, before being re-synchronized, these respective delayed marked source signals are just summed up in the aggregate node AN1.

In FIG. 1 only one aggregate node is shown, whiich is directly linked to a multicast node. In general a chain of aggregate nodes may exist, as will be explained with reference to FIG. 2. The last aggregate node AN then sums up different received signals e.g. DAG1 and DAG2 in FIG. 2, to generate a final aggregated signal DA, which is then multicast back to the different receivers.

In FIG. 1 the multicast node is denoted mcast and there is just one aggregate node coupled to mcast. This multicast node is then adapted to receive the aggregate signal DAG1 from this aggregate node, and further provides it in a multicast configuration towards all receivers associated to the transmitters coupled to the aggregate node.

The receiver associated to transmitter TX1, is denoted RX1 in FIG. 1. RX1 receives from TX1 the marked source signal D1, and receives from mcast the multicast aggregate signal, in this embodiment just the aggregate signal DAG1. Receiver RX1 is further adapted to subtract a delayed and power normalized marked source signal from the multicast aggregate signal DAG1 This is because DAG1 contains a time-delayed copy of D1 that has been attenuated with a well-known value, related to the number of speaking participants to the conference call. This attenuation value can be considered as a round trip power normalization value and is equal to the amount of active transmitters participating to the call as this round trip power normalization value is a consequence of the summation process in the aggregating nodes. By making use of the inherent gain adaptation to use the full resolution available to the digital coders in the receivers and due to the markers, the exact delay of DAG1 with respect to D1 can also be determined, e.g. by comparing the received signal DAG1 with the marker signal m1 but shifted to a certain variable delay, such that, when e.g. in a comparator both markers coincide, the delay is be determined. By subtracting the then delayed and power adjusted D1 signal from DAG1, an echo-free multicast signal is then obtained. This is denoted EC1 and is provided to an output device, in the FIG. 1 being depicted as a loudspeaker L1. Optionally, to facilitate this process, also the original source signal S1 may separately be provided to the loudspeaker, for enabling the user to hear himself or herself speaking.

Figure 2:
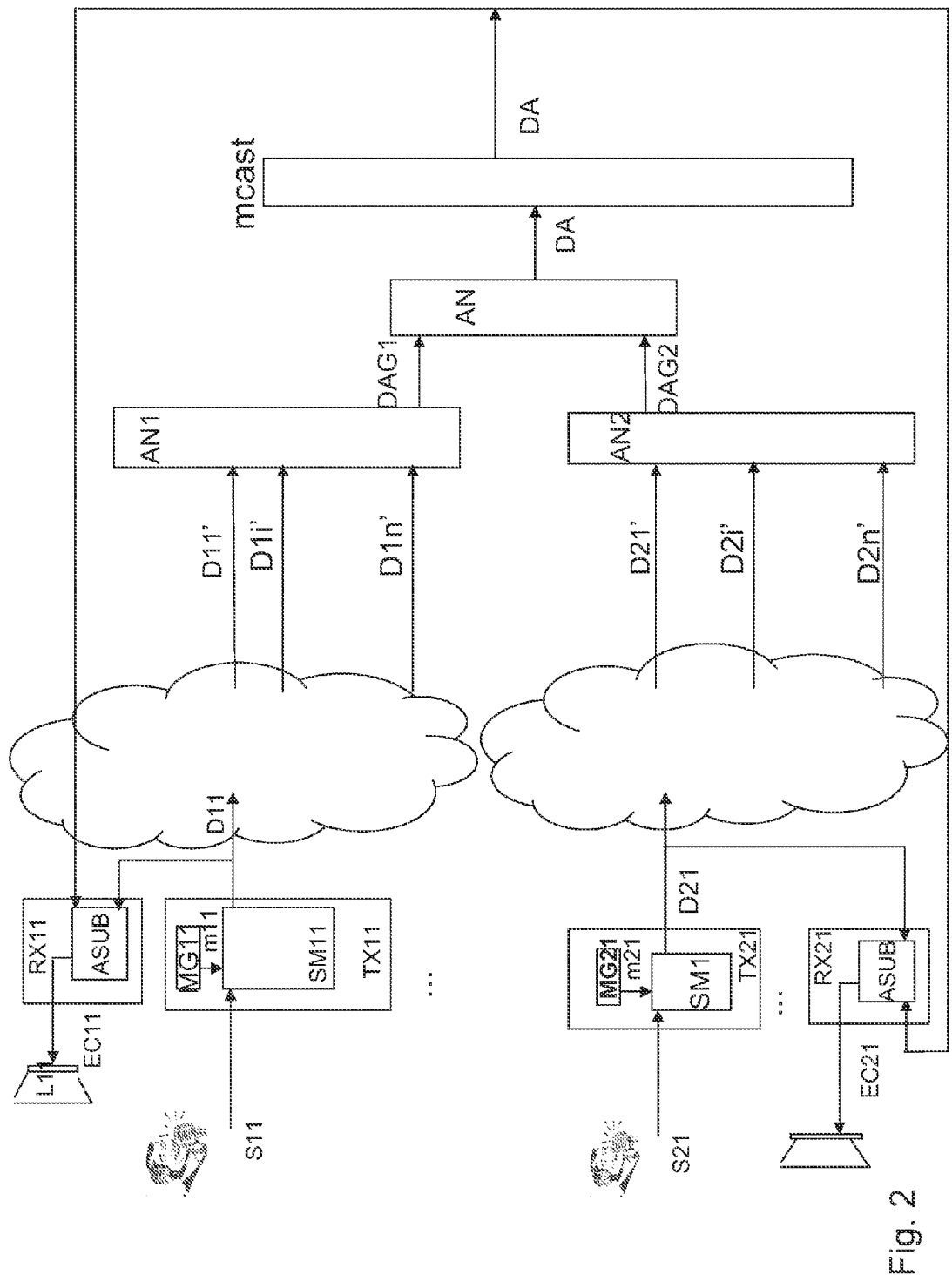
FIG. 2 shows a configuration of a tree structure of aggregate nodes with associated coupled transmitters and receivers, and one multicast node.

FIG. 2 shows a system comprising two clusters of aggregate nodes coupled to respective transmitter/receiver combinations, and of which each aggregate node is now coupled to a final aggregated node, itself connected to a multicast node. The operation within each cluster in the upstream direction, thus from the transmitter to the aggregate node, is basically the same as was explained with reference to FIG. 1. The difference with the embodiment of FIG. 1 is that each aggregate node AN1 and AN2 now provides its respectively generated aggregate signal DAG1, DAG2 to the final aggregator node AN which now sums the respective aggregate signals DAG1 and DAG2 into a final aggregate signal, denoted DA, which will then correspond to the multicast signal for provision to the multicast node. This multicast node mcast will further provide this multicast signal to the two pluralities of receivers coupled to the respective aggregate nodes AN1 and AN2.

It is to be remarked that in some embodiments the multicast node and the final aggregate node can be combined such as to be incorporated into one single apparatus.

In all embodiments every participant receives exactly the same copy of the aggregate signal DA. The distribution from the multicast node mcast back to all the participants can thus be optimized with a multicast tree, guaranteeing large bandwidth and energy savings as every node in the multicast tree handles exactly the same signal, allowing the tree to be optimized for network topology. In traditional systems, this was impossible as the signal going to every participant is not the same.

Such a distributed system may generally use 2 different tree structures to manage the upstream and the downstream data. The upstream data uses a tree that carries different signals on all branches. Adding a new audio source to this tree can be done locally in the tree, thus via the aggregate node coupled to the new transmitter. This has no impact on the rest of the tree.

The downstream data uses a tree that carries the same multicast signal, denoted DA, on all branches. Adding a new audio listener or receiver coupled to non-active transmitter to this tree can be done locally, and more importantly, the tree can be very easily re-balanced since all branches carry the same signal. This makes it very easy to subscribe a huge amount of passive, listening participants to the connection Within a receiver e.g. RX11 coupled to active transmitter TX11, the marked source signal D11 is again first normalized with the round trip power normalization factor and delayed with a time delay. The power normalization may be determined as the amount of active transmitters participating to the call, and the delay values may e.g. be determined from DA by means of the previously mentioned technique of comparing a pure marker signal with a time varying base, with the received signal. The time instance where the markers are found to coincide then corresponds to the round trip delay. The normalized and delayed signal is next subtracted from the multicast aggregate signal DA, for thereby obtaining an echo-free multicast signal for the respective receivers, respectively denoted EC11 and EC21 for receivers RX11 and RX21 in FIG. 2.

These delay and power normalization operations are performed by means of the module "ASUB" as indicated in the receiver RX11 and RX21.

Similar operations take place in all other receivers.

An implementation may be realized by means of software, implemented in a distributed way on the potentially participating transmitters, receivers, aggregate nodes and multicast nodes. This software can be provided in a distributed way, for local installation, or can be downloadable software, e.g. from a central server controlling the complete operation. This server can be positioned in the aggregate nodes or multicast nodes, or can be a remote server, from which all participating elements can just download their part for implementing their specific operation.

While the principles of the invention have been described above in connection with specific apparatus, it is to be clearly understood that this description is made only by way of example and not as a limitation on the scope of the invention, as defined in the appended claims. In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for, and unless otherwise specifically so defined, any physical structure is of little or no importance to the novelty of the claimed invention. Applicant thus regards any means which can provide those functionalities as equivalent as those shown herein.

What is claimed:

1. A method for echo cancellation, comprising:
    marking respective source signals with a respective marker signal to identify respective starting time references of said respective source signals and to identify respective transmitters to transmit respectively obtained marked source signals;
    transmitting the respectively marked source signals by said respective transmitters to at least one aggregate node;
    summing the respective marked source signals received by said at least one aggregate node to create a multicast signal for provision, via a multicast node, to respective receivers associated to the respective transmitters;
    determining respective round trip power normalization and round trip delay values for modifying, in said respective receivers, said respective marked source signals to obtain respective delayed and normalized respective marked source signals, wherein the respective round trip normalization value is determined as the amount of transmitters participating in a call as a consequence of the summation process in the at least one aggregation node, and wherein the respective round trip delay value is determined by comparing said multicast signal with the respective marker signal but shifted to a certain variable delay, such that when both markers coincide, the delay is determined; and
    subtracting, at said respective receivers, the respective round trip delayed and normalized marked source signal from said multicast signal to obtain respective echo cancelled multicast signals in said respective receivers.

2. The method according to claim 1, wherein the respective marker signal is generated as an in-band signal to said respective source signal.

3. The method according to claim 1, wherein said respective marker signal is generated as an out-of band signal to said respective source signal.

4. A system, comprising:
    a plurality of transmitters;
    a plurality of receivers;
    a multicast node; and
    at least one appreciate node;
    wherein each transmitter comprises a signal source modification means adapted to mark a source signal with a marker signal to identify a time reference of said source signal and to identify the transmitter, said signal source modification means being adapted to generate a marked source signal for transmission to a multicast node via the at least one aggregate node; and
    wherein the at least one aggregate node being adapted to sum the respective marked source signals from said transmitters to create a multicast signal for provision, via the multicast node, to said plurality of receivers; and
    wherein each receiver being associated to a transmitter of said plurality of transmitters and coupled to the multicast node for receiving therefrom a multicast signal, said receiver being further adapted to determine respective round trip power normalization and round trip delay values for being used during a modifying step, in said receiver, of a respective marked source signal, provided by said transmitter associated to said receiver, to generate a respective delayed and normalized marked source signal, said receiver further being adapted to subtract the respective round trip delayed and normalized marked source signal from said multicast signal to obtain an echo cancelled multicast signal, wherein the receiver is further adapted to determine the respective round trip normalization value as an amount of transmitters participating in a call as a consequence of the summation process in the at least one aggregation node coupled to said transmitters, and wherein said receiver is further adapted to determine the respective round trip delay value by comparing said multicast signal with a respective marker signal received from said transmitter, shifted to a certain variable delay, such that when both markers coincide, the delay is determined.

5. The system according to claim 4, wherein each transmitter comprises a marker generating means which is adapted to generate said marker signal as an in-band signal to said source signal.

6. The system according to claim 4, wherein each transmitter comprises a marker generating means which is adapted to generate said marker signal as an out-of-band signal to said source signal.

7. A receiver associated with a transmitter of a plurality of transmitters and coupled to a multicast node to receive therefrom a multicast signal, said receiver being adapted to:
    determine respective round trip power normalization and round trip delay values to modify, in said receiver, a respective marked source signal provided by said transmitter associated with said receiver to generate a respective delayed and normalized marked source signal;
    subtract the respective round trip delayed and normalized marked source signal from said multicast signal to obtain an echo cancelled multicast signal;
    determine the respective round trip normalization value as the amount of transmitters participating in a call as a consequence of the summation process in at least one aggregation node coupled to said transmitters; and
    determine the respective round trip delay value by comparing said multicast signal with a respective marker signal received from said transmitter, shifted to a certain variable delay, such that when both markers coincide, the delay is determined.

* * * * *